United States Patent
Boehme et al.

(10) Patent No.: US 10,678,784 B2
(45) Date of Patent: Jun. 9, 2020

(54) DYNAMIC COLUMN SYNOPSIS FOR ANALYTICAL DATABASES

(71) Applicant: INTERNATIONAL BUSINESS MACHINES CORPORATION, Armonk, NY (US)

(72) Inventors: Thomas F. Boehme, Boeblingen (DE); Andreas Brodt, Gerlingen (DE); Oliver Koeth, Stuttgart (DE); Oliver Schiller, Dettingen/Teck (DE)

(73) Assignee: International Business Machines Corporation, Armonk, NY (US)

(*) Notice: Subject to any disclaimer, the term of this patent is extended or adjusted under 35 U.S.C. 154(b) by 77 days.

(21) Appl. No.: 15/861,746

(22) Filed: Jan. 4, 2018

(65) Prior Publication Data
US 2018/0129675 A1 May 10, 2018

Related U.S. Application Data

(63) Continuation of application No. 15/157,441, filed on May 18, 2016, now Pat. No. 10,331,662.

(51) Int. Cl.
*G06F 17/00* (2019.01)
*G06F 16/242* (2019.01)
*G06F 16/22* (2019.01)

(52) U.S. Cl.
CPC ........ *G06F 16/2425* (2019.01); *G06F 16/221* (2019.01)

(58) Field of Classification Search
CPC ............. G06F 16/9535; G06F 16/2282; G06F 16/24578; G06F 3/0482; G06F 16/40; G06F 16/435

See application file for complete search history.

(56) References Cited

U.S. PATENT DOCUMENTS

| | | | |
|---|---|---|---|
| 8,990,335 B2 | 3/2015 | Fauser et al. | |
| 2010/0049702 A1* | 2/2010 | Martinez | H04L 67/306 707/769 |
| 2012/0310926 A1* | 12/2012 | Gannu | G06Q 30/02 707/723 |
| 2014/0095520 A1 | 4/2014 | Ziauddin et al. | |
| 2015/0088812 A1 | 3/2015 | Ziauddin et al. | |

(Continued)

OTHER PUBLICATIONS

List of IBM Patents or Patent Applications Treated as Related. Filed Jan. 4, 2018. 2 pages.

(Continued)

*Primary Examiner* — Truong V Vo

(74) *Attorney, Agent, or Firm* — L. Jeffrey Kelly

(57) ABSTRACT

A method, computer program product, and system for processing attribute value information for a data set. The method, computer program product, and system includes receiving a first data query on the data set. The first data query includes a condition on at least one attribute of the data set. While processing the first data query, data blocks containing records of the data set may be scanned. The data blocks contain first data blocks that are full. Attribute value information may be generated for the at least one attribute for the first data blocks. The attribute value information may be stored and a second data query involving a condition on at least one of the at least one attribute may be processed using the stored attribute value information.

20 Claims, 4 Drawing Sheets

(56) References Cited

U.S. PATENT DOCUMENTS

| | | | |
|---|---|---|---|
| 2015/0123825 A1* | 5/2015 | De Corral | H03M 7/3059 341/87 |
| 2015/0193497 A1 | 7/2015 | Tallamy | |
| 2017/0024452 A1* | 1/2017 | Budalakoti | G06F 16/24556 |
| 2017/0337210 A1 | 11/2017 | Boehme et al. | |

OTHER PUBLICATIONS

Oracle®, Database Data Warehousing Guide, "13 Using Zone Maps", Copyright 2015, Oracle Database Online Documentation 12c Release 1 (12.1), pp. 1-28, http://docs.oracle.com/database/121/DWHSG/zone_maps.htm.

Abadi et al., "The Design and Implementation of Modern Column-Oriented Database Systems", Foundations and Trends® in Databases, vol. 5, No. 3 (2012) pp. 197-280.

Oracle®, Database 12C, "Oracle Database 12c—Built for Data Warehousing", Feb. 2015, pp. 1-32, Oracle White Paper.

Ślęzak et al., "Brighthouse: An Analytic Data Warehouse for Ad-hoc Queries", PVLDB 2008, Aug. 23-28, 2008, pp. 1337-1345, Auckland, New Zealand.

Chainani et al., "DB2 with BLU Acceleration: A rapid adoption guide", developerWorks®, May 7, 2015 (First published Sep. 19, 2013), pp. 1-15.

Graefe et al., "Self-selecting, self-tuning, incrementally optimized indexes", EDBT 2010, Mar. 22-26, 2010, Lausanne, Switzerland, pp. 371-381, Copyright 2010 ACM.

Idreos et al., "Database Cracking", pp. 1-11, CIDR 2007.

Kersten et al., "Cracking the Database Store", pp. 1-12, Proceedings of the 2005 CIDR Conference.

Voigt et al., "SMIX—Self-Managing Indexes for Dynamic Workloads", SSDBM, Jul. 29-31, 2013, pp. 1-12, Baltimore, MD, USA, Copyright 2013 ACM.

* cited by examiner

DYNAMIC COLUMN SYNOPSIS FOR ANALYTICAL DATABASES

BACKGROUND

The present invention relates to the field of digital computer systems, and more specifically, to a method for processing attribute value information of a data set.

Analytical database systems manage large amounts of data and are optimized for queries to read large portions of data. At the same time, they offer the complete querying power of SQL, or structured query language. Analytical database systems do not focus on OLTP load, or on line transaction processing load, (i.e. involving point queries) and typically do not index each data row, and rely on scan performance.

With the increasing trend for on-demand real- or near-time analysis, more and more small writes to the analytical database must be executed to synchronize the analytical database with the OLTP system. Thus, write performance is becoming an important requirement. There is a need for a key performance enabler of analytical queries on big data sets.

SUMMARY

Various embodiments provide a method for processing attribute value information of a data set, computer system and computer program product as described by the subject matter of the independent claims. Advantageous embodiments are described in the dependent claims. Embodiments of the present invention can be freely combined with each other if they are not mutually exclusive.

In an aspect, the invention relates to a computer-implemented method for processing attribute value information for a data set. The method includes receiving a first data query on the data set, the first data query including a condition on an attribute of the data set, in response to processing (or while processing) the first data query, scanning data blocks containing records of the data set, the data blocks containing first data blocks that are full, generating attribute value information for the attribute for the first data blocks, (the attribute value information is descriptive of the attribute), storing the attribute value information and processing a second data query on the data set using the stored attribute value information, the second data query including a condition on the attribute.

In another aspect, the invention relates to a computer program product including a computer-readable storage medium having computer-readable program code embodied therewith, the computer-readable program code configured to implement all of the steps of the method according to preceding embodiments.

In another aspect, the invention relates to a computer system for processing attribute value information for a data set. The computer system is configured for receiving a first data query on the data set, the first data query including a condition on an attribute of the data set, in response to processing the first data query, scanning data blocks containing records of the data set, the data blocks containing first data blocks that are full, generating attribute value information for the attribute for the first data blocks, storing the attribute value information and processing a second data query on the data set using the stored attribute value information, the second data query including a condition on the attribute.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
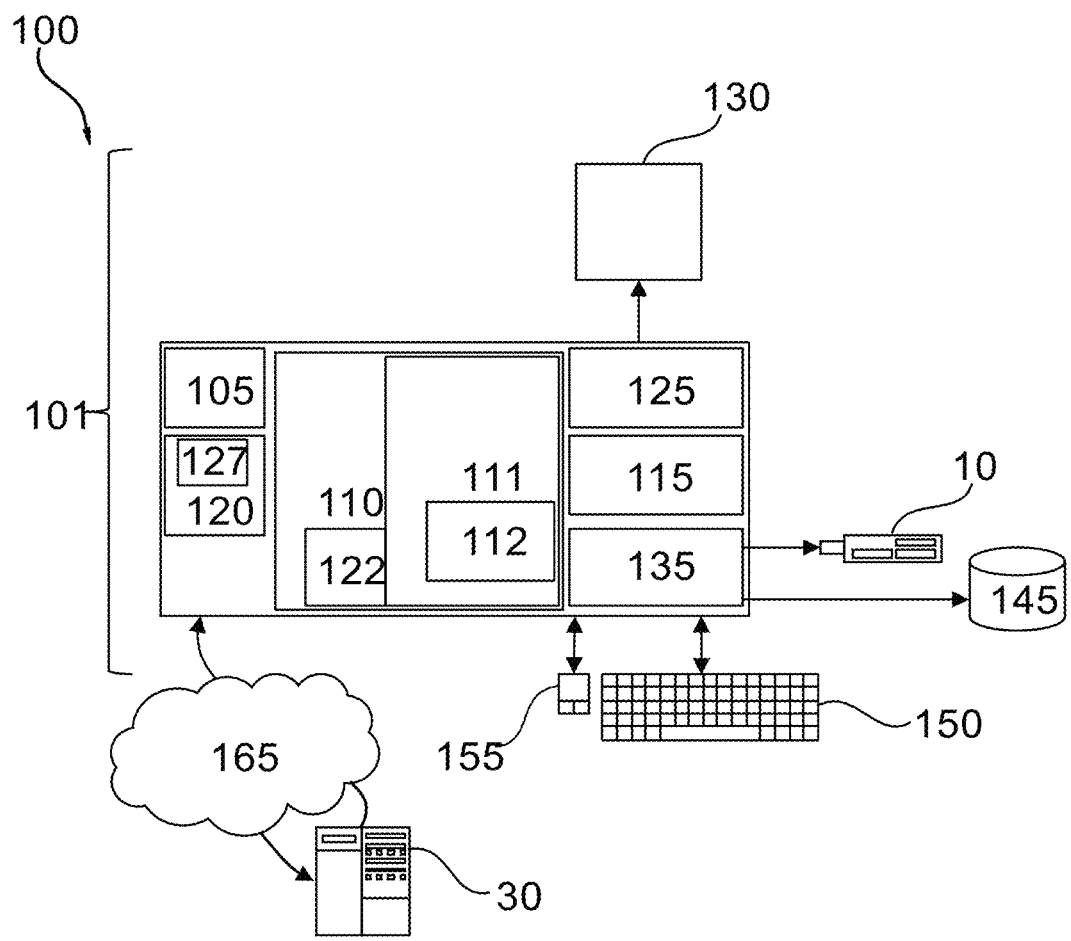
FIG. 1 represents a computerized system, suited for implementing one or more method steps, in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may be advantageous as the demand for attribute value information triggers their generation. In other words, the present method may enable a dynamic (on the fly) generation of attribute value information. That is, attribute value information is not computed or stored for columns or attributes on which it is not needed or requested. Thus, attribute value information is not gathered for columns that are not scanned at all, that are not scanned with a restriction, or that are only scanned with restrictions that cannot exploit attribute value information, such as LIKE '% ABC'. Thus, the present method may reduce the total amount of CPU load and memory space that is spent for computing and storing attribute value information.

The generation of the attribute value information may be performed only when processing the read requests. This may have the advantage that the work in term of attribute value information regeneration that remains to be done may be distributed differently, from writers (e.g. the second data query) to the first readers (e.g. subsequent queries, to the second data query, on the data set). Especially in trickle-feed scenarios with many consecutive small writes, considerable speed improvements may be achieved. For example, assuming that the second data query includes a write request that processed a given first data block of the first data blocks, in other words a given first data block of the one or more data blocks. The second data query is followed by a third data query which is also a write request that processed the given first data block and further followed by a fourth data access request which is a read request. With the present method, the attribute value information for the given first data block will be regenerated only at once by the fourth data request instead of regenerating it three times with every data request.

The present method may not store and maintain the attribute value information on persistent storage. Instead of generating the attribute value information eagerly whenever data is inserted in a load, insert, or update operation, the present method may generate the attribute value information "lazily" and keep it at least in part in main memory only. Thus, the first query that requires attribute value information on a particular attribute has to scan the complete attribute and compute the minimal and maximal value of every scanned data block.

The attribute value information may be descriptive of the attribute. Using the attribute value information, a preselection of the first data blocks may be performed before scanning the preselected first data blocks. The attribute value information may include information or metadata on the attribute that allows such a preselection. In an example, the attribute value information may include at least one of the following: minimum attribute value of the first data block, maximum attribute value of the first data block and the number of rows of the first data block.

For example, the maximum and the minimum attribute values define a first range of values of the attribute in a respective first data block. For example, the second data query may require a second range of values of the attribute. The processing of the second query may include selecting the first data blocks whose respective first range overlap with the second range and processing at least those selected first data blocks (e.g. in addition to data blocks for which the attribute value information may have not been generated by the first data query).

In another example, the attribute may represent multidimensional spatial data objects, and may have multiple values representing respective dimensions of the multidimensional spatial data object. In this case, the attribute value information may define a multidimensional minimum bounding rectangle that covers attribute values of the attribute included in the first data block. In this case, the processing of the second data query on the multidimensional spatial data objects associated with a query area using the multidimensional minimum bounding rectangle to check whether a first data block of the first data blocks contains attribute values of the attribute in the query area. The minimum bounding rectangle (MBR) is an expression of the maximum extents of a 2-dimensional object (e.g. point, line, polygon) or set of objects within its (or their) 2-D (x, y) coordinate system, in other words min(x), max(x), min(y), max(y). The MBR is a 2-dimensional case of the minimum bounding box or multidimensional minimum bounding rectangle. The multidimensional minimum bounding rectangle or minimum bounding box, is an expression of the maximum extents of a multi-dimensional object. The term "spatial data" refers to the representation of multi-dimensional data objects, such as points, lines and surfaces, as a list of numbers using a particular coordinate system.

The query area refers to an area for which a user requests data. For example, the query area may be defined by two or more range searches based on selections on two or more values that correspond to different dimensions of the spatial objects. For example, the second data query may be received or generated in the form of a SQL statement including a WHERE statement that selects or requires data objects having a longitude location between long1 and long2 values and a latitude location between lat1 and lat2 values. In this case the query area may be a rectangle defined by a lowest left corner (long1, lat1) and an upper right corner defined by the pair (long2, lat2) in a space defined by the two dimensions, longitude and latitude. By using the MBR the second data query may process at least part of the first data blocks for which the MBR matches the query area.

The first data query may be a read request. The second data query may be a read or write request. The write request may include an insert, a delete, or an update of data.

According to an embodiment, processing the second data query includes: in response to determining that a first data block of the first data blocks is modified, regenerating (or updating) the attribute value information of the determined first data block. In other words, after the first data query has been processed and before the second data query is processed an intermediate query may have modified the first data block. For example, the modification may be caused by a deletion of one or more records which results in the first data block no longer being full. Alternatively, the modification may be caused by an in-place update where one or more records of the first data block has been replaced by other records, i.e. the first data block is still full, but the attribute value information may not be valid. This embodiment may be advantageous as it may enable accurate query processing using up to date attribute value information. The present embodiment may be repeated for each subsequent query that determines that a first data block of the first data blocks is modified. In other words, the initial generation of the attribute value information may require that the first data block is full. However, for the update or regeneration of the attribute value information for those first data blocks it may not be necessary that they are full. It is not necessarily the case that all data blocks are full for regenerating the attribute value information. There may be storage systems in which existing rows of a first data block can be deleted, but their newer replacements are inserted at the end (in another block) but not in the first data block from which they are deleted. After this, the first data block is not full any more (even if the attribute value information is recomputed by the next query—the block may not be full again).

According to an embodiment, the second data query includes a write data access request, wherein processing of the second data query includes comparing the value of the attribute of the record to be inserted or to be deleted from a first data block of the first data blocks with the attribute value information of the first data block. Based on the result of the comparison, deleting the attribute value information of the first data block and marking the first data block as a data block requiring an update of the attribute value information. For example, the new inserted or deleted record influences the content of the attribute value information, e.g. the deleted record has the maximum or minimum value of the attribute or the inserted record has a value of the attribute that is higher than the maximum attribute value or smaller than the minimum attribute value of the attribute value information. This embodiment may save processing resources that would otherwise be required when updating the attribute value information without performing any check. This embodiment may further be advantageous as it may enable accurate query processing using up to date attribute value information.

According to an embodiment, the second data query includes a write data access request, wherein the processing of the second data query includes in case of processing a first data block of the first data blocks deleting the attribute value information of the first data block and/or marking the first data block as a data block requiring an update of the attribute value information. With this embodiment every modification may lead to invalidating the corresponding attribute value information.

According to an embodiment, the processing of the second data query includes generating attribute value information of a first data block of the first data blocks if not yet generated when processing the first data query. This embodiment may enable parallel processing of the attribute value information which may speed up the processing of the attribute value information. Another advantage may be that the second data query may benefit from attribute value information that the first data query has created in the meantime and vice versa.

According to an embodiment, the method further includes: assigning a status parameter to each data block of the data set, the status parameter having a first, second and/or third value, the first value indicating a first state of the data block in which the data block is associated with (or has) attribute value information, the second value indicating a second state of the data block in which the data block is not associated with (or has not) attribute value information, the third value indicating a third state of the data block in which the data block is not associated with attribute value information and the attribute value information is not to be generated for the data block. This embodiment may be advantageous as it may speed up the process of generating the attribute value information especially when multiple queries run on the data set during a short time period e.g. reading the values of a single status parameter may easy the discovery process of the data blocks.

According to an embodiment, the generating of the attribute value information for a first data block includes determining that the status parameter of the first data block has the second value.

According to an embodiment, the second data query includes a write data access request. A write request may for example include the replacement of a record of a first data block by another record. The processing of the second data query includes in response to determining that a first data block of the first data blocks to be processed by the second data query has the first value, invalidating the attribute value information of the determined first data block by setting the status parameter of the determined first data block to the second value. Although the first data block was full at the time of generating the attribute value information it may in a later point time become not full e.g. because of the deletion of a record etc. Thus, the attribute value information may not be valid especially if the missing record has one of the maximum or minimum value of the attribute value information. This embodiment may be advantageous as it may prevent inaccurate query processing results based on outdated attribute value information. In an example, the invalidating of the attribute value information may further include deleting the attribute value information.

According to an embodiment, the second data query includes a write data access request. In this case, the first data block may be modified by the second data access request. The processing of the second data query includes invalidating the attribute value information of a first data block of the first data blocks to be processed by the second data query by setting the status parameter of the first data block to the second value. For the deletion of a record it may not be necessary to check the status parameter.

According to an embodiment, the status parameter has a fourth value, wherein the fourth value indicates a fourth state of the data block in which the data block requires an update of the attribute value information of the data block. The processing of the second data query further includes setting the status parameter to the fourth value, receiving a third data request involving or including a condition on the attribute, wherein the third data request is a read data access request, and updating the invalidated attribute value information when processing the third data request. By having only read requests updating or generating the attribute values information interference with data write requests may be prevented. If data is inserted or updated (updates are typically implemented as deletes and inserts), the write transactions may not update the attribute value information. If the new data is written to a new data block, this may result in this data block not being covered by attribute value information. If new data is written to an existing data block, this data block had not been full yet, so that no attribute value information may have existed for it. Both cases leave at least parts of the column uncovered by attribute value information, so that the next query may scan these parts in any case and may generate the attribute value information. As a consequence, write transactions and queries updating the attribute value information concurrently do not interfere with each other. Moreover, at most one scan may generate attribute value information for the same attribute at the same time.

According to an embodiment, the processing of the first data query includes locking the attribute using a lock, wherein generating the attribute value information includes using the lock, or checking the lock status, for performing the generation of the attribute value information using the lock. For example, a query processor that controls the processing of the queries in the present system may be configured so as to allow only the first data query that is associated with the lock to make the generation of the attribute value information for the attribute. Another query that is not associated with that lock cannot (or will be prevented by the query processor to) generate the attribute value information for that attribute; however, the other query may generate attribute value information for another attribute that is different from the attribute.

In another example, the lock may be defined based on the storage structure being used to store the data set. For example, the lock may be defined so as to prevent the generation of the attribute value information for the attribute in a given data block only. This means that for another data block the attribute value information may be generated by other than the first data query. Other locking methods (e.g. of blocks, or rows and/or attributes) may be used so as to enable an efficient generation of the attribute value information.

According to an embodiment, the processing of the second data query starts before the end of processing of the first data query. The method further includes preventing the computation of the attribute value information when processing the second data query by preventing access to the lock to processes or scans caused by the second data query.

These embodiments may have the advantage of preventing redundant generation of the attribute value information and may thus save processing resources.

According to an embodiment, the method further includes releasing the lock after processing the first data query is finished. Releasing the lock may enable processing of attribute value information (e.g. for further new records) by subsequent data queries.

According to an embodiment, the method further includes: providing a first and second storage device. The first storage device has higher data access performance than the second storage device. The generating of the attribute value information of a first data block of the first data blocks includes: determining an access frequency to the first data block, storing the attribute value information of the first data block in the first or second storage device based on the determined access frequency of the first data block. The data access performance includes speed of the data access and/or Input/Output operations per time interval and/or a latency for each of read operations. This embodiment may speed up the query processing on the data set.

According to an embodiment, the method further includes determining an access frequency to a given first data block of the first data blocks, deleting the attribute value information of the given first data block if the determined access frequency is smaller than a predetermined frequency threshold. This may further save storage space.

According to an embodiment, the method further includes assigning a counter to the given first data block, wherein upon receiving a data query for accessing the given first data block, incrementing the counter, comparing the counter with a predefined minimum number of accesses and if the counter is higher than the minimum number of accesses regenerating the attribute value information for the given first data block. This may enable efficient usage of the storage by generating only attribute value information that may be used with a reasonable frequency.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software in the memory 110 includes software 112, e.g. instructions to manage databases such as a database management system. The memory 110 may further include a query optimizer. The query optimizer may include instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program, executable program (object code), or software 112, script, or any other entity including a set of instructions or software 112 to be performed. When in the form of a source program, then the source program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. The I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS), for example firmware 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as shown in FIG. 1, the methods can be stored on any computer readable medium, such as storage 120, for use by or in connection with any computer related system or method. The storage 120 may include a disk storage such as HDD storage.

The storage 120 may include at least one data set (or data table) 127. For example, the software 112 may receive (automatically or upon request) as input the data set 127, or may download the data set 127 from storage 120 or memory 110.

The data set 127 may include one or more columns 131A-B, wherein each column is represented by a respective attribute (e.g. "ID" 131A and "Age" 131B). The rows of the data set 127 may include values of the attributes. The data set 127 may for example include multiple (e.g. contiguous) data blocks b1-bN.

For example, as illustrated in FIG. 1 the data set 127 may be divided or split or assigned to data blocks b1-bN using the number of rows in the data table 127 e.g. 2 rows per data block b1-bN. In the provided example, the block b6 may not be full as it only has one row.

In another example, the data set 127 may be split or divided based on storage size such that each data block b0-bN contains a predefined number of storage units e.g. data pages. The term "storage unit" as used herein is intended to refer to the minimum addressable unit (e.g. by software 112) in order to store the data set 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage units may include containers and extents, wherein extents can be defined in term of number of data pages, while a container can be determined in term of number of extents.

The rows of each data block e.g. b1 of the data set 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not include the same number of data pages.

The term "data set" or data table as used herein refers to a collection of data that may be presented in tabular form. Each column in the data set may represent a particular variable or attribute. Each row in the data set may represent a given member, record or entry of the data set.

New data, for data set 127, may be appended at the end of a column e.g. 131B. The same holds for updates; they delete the old row and append a new version at the end. Note that this principle can be extended by approaches which split a column into 50 ranges. A write transaction writes exclusively to exactly one range appending new data at the end of the range. This allows up to 50 write transactions to insert new data into the same column in parallel, but with regard to their respective range, they all append at the end.

A scan (caused by one or more queries) may decide how to process a column. In an alternative implementation, a query compiler may decide how to process a column and create a query plan.

A column-store may be used, such as DB2 BLU, for the sake of a simpler presentation for data set 127. However, the present method may work for row-stores structures. In a row store, a scan processes not a single column, but a single table and compute attribute value information (as described below) for all table columns on which it must evaluate scan predicates.

FIG. 1 shows two attributes and 'N' data blocks, and it will be appreciated that numerous attributes and/or data blocks may exist or may be used.

Figure 2:
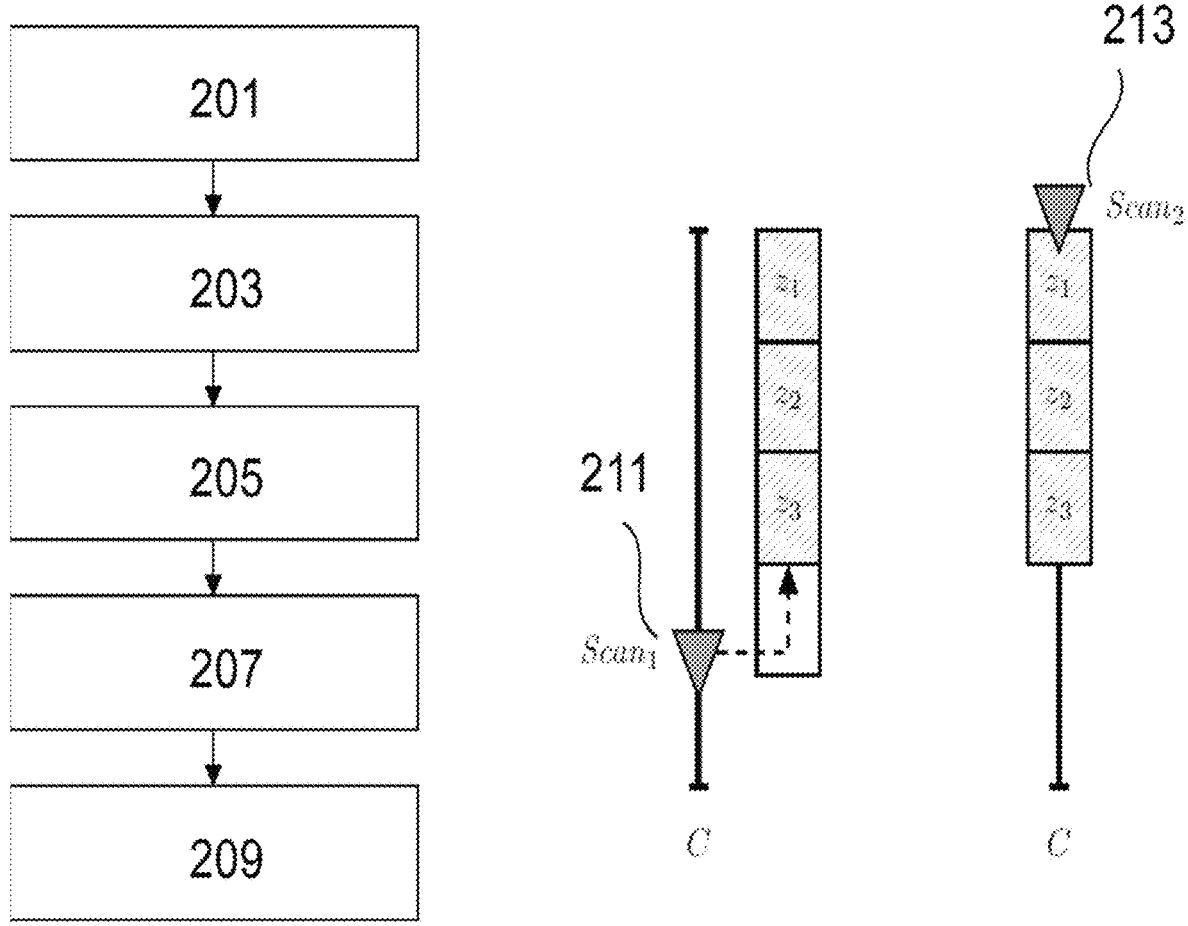
FIG. 2 is a flowchart of a method for processing attribute value information for a data set, in accordance with an embodiment of the present invention.

FIG. 2 is a flowchart of a method for processing attribute value information for a data set e.g. data set 127.

In step 201, a first data query on the data set 127 may be received. The first data query involves (or includes) a condition on at least one attribute 131B of the data set 127. For example, the first data query may be a read request to read records satisfying the condition on the at least one attribute. The first data query may for example include a condition on the attribute 131B such that records having an Age value higher than 40 may be read.

The first data query may be the initial query to access the data set 127, e.g. first received as soon as the data set is stored or created. In other words, none of the data blocks b1-bN is associated with attribute value information as defined herein. The first data query may cause or trigger one or more scans (e.g. successive scans) of the data set 127 e.g. Scan1 211 and Scan2 213 as illustrated in FIG. 2. The scans Scan1 211 and Scan2 213 may be caused by one or more queries involving a condition on the attribute C of the data set 127.

In an example, a status parameter may be assigned to each data block of the data set (e.g. the status parameter values may be stored in association with each data block of the data set). The status parameter may have a first, second and/or third value. The first value indicates a first state of the data block in which the data block is associated with attribute value information. The second value indicates a second state of the data block in which the data block is not associated with attribute value information. The third value indicates a third state of the data block in which the data block is not associated with attribute value information and the attribute value information is not to be generated for the data block. The state of the data block as described by the third value may cover in one example the case where the data block is not full yet (and will still receive new rows). This may facilitate access to the data blocks of the data set. For example a data block may be associated with one of the first, second and third values. Initially, the data blocks b1-b5 (e.g. before being processed in accordance with the present method) may be associated with the second value of the status parameter, while data block b6 may be associated with the second value.

In step 203, the processing of the first data query may be started, wherein in connection with processing the first data query (or while processing the first data query) data blocks b1-bN containing records of the data set 127 may be scanned. The data blocks b1-bN contain first data blocks that are full. A data block is full if it contains a number of records that are assigned to be contained in the data block. For example, a data block may be defined by the maximum number of records that may contain. In this case, the data block is full if it contains the maximum number of records. As illustrated in FIG. 1, b1-b5 are full since they each contain the maximum number (two) of records, while b6 is not full as it contains only one record or raw.

In another example, a data block may be defined by assigning a predefined storage size to the data block. In this case, the data block is full if the storage size assigned to the data block is covered by the records of the data block.

In step 205, attribute value information may be generated for the at least one attribute 131B for the first data blocks b1-b5. Computing or generating the minimal and maximal value of a data block may be an operation that can be offloaded to special hardware, such as an FPGA or a GPU. Thus, the first scan may not necessarily cause extra CPU load. For example, the generation of the attribute value information may be performed by the read requests only.

The attribute value information may contain for example at least one of the following: minimum attribute value of a data block and maximum attribute value of a data block. For example, while scanning record by record a first data block b1-b5, the values of the at least one attribute 131B are ranked so as to identify the minimum attribute value and the maximum attribute value of that attribute 131B. Using the example data set 127 above, data block b1 may have the maximum attribute value 40 for attribute 131B and the minimum attribute value 35 for attribute 131B.

In other words, for each first data block of the first data blocks b1-b5 an attribute value information (e.g. indicative of a range of values of the attribute 131B in the data block) may be generated or computed. The attribute value information may in addition or alternatively be indicative of a range of values of one or more other attributes 131A in the data block. The generation of the attribute value information for each of the first data blocks b1-b5 results in at least one extremum set of maximum and minimum values of the attribute 131B. For example, data block b2 has a minimum value of the "Age" 131.B of 15 and a maximum value of the attribute 131B of 56 and has a minimum value of the "ID" 131.A of 380 and a maximum value of the attribute 131A of 420.

For example, before generating the attribute value information of a given first data block b1-b5, it may be determined that the status parameter of the given first data block has the second value, because the second value indicates that the given first data block has no attribute value information associated with it, and thus the attribute value information has to be generated for the given first data block.

For example, the generation or computation of the attribute value information may include generating a multidimensional data structure (e.g. for each attribute of the data set 127) for representing the first data blocks b1-b5. For each first data block e.g. b1 of the data blocks b1-b5 a respective data element may be added into the multidimensional data structure, wherein the data element has values (e.g. the minimum and maximum values of the attribute 131B in b1) of data block b1 indicative of the attribute 131B.

The term multidimensional data structure refers to a data structure for indexing multidimensional information. The multidimensional data structure may for example represent a map that is viewed as a two dimensional image, wherein points on the map are stored as data elements on the multidimensional data structure. The multidimensional data structure supports various types of queries, e.g. a range query. For example, the multidimensional data structure includes a spatial index. The spatial index may be used to divide the indexed space (space defined by the multiple values of the attribute and covering the data elements of the spatial index) into search rectangles (or index rectangles) each includes a respective number of data elements. For example, a search rectangle may be defined by a lower left corner and an upper right corner. In this case, the multiple attribute values assigned to a given data element include the minimum and maximum values of the first attribute in the respective data block, the lower left corner may be defined by the lowest minimum and maximum values of the requested range and the upper right corner may be defined by the highest minimum and maximum values of the requested range. Using this data structure, search rectangles that are covered by the query area may be searched. A search rectangle is either completely contained in, partially overlapping with, or disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

In step 207, the attribute value information may be stored. A second data query involving (or including) a condition on at least one attribute may be (or will be processed) processed in step 209 using the stored attribute value information. The condition of the second data query on the attribute 131B may be evaluated (at least in part) using the attribute value information. The condition may be an inequality condition (smaller, BETWEEN or higher) or equality condition, or a prefix search that may be pre-evaluated using the attribute value information so as to scan only data blocks that may contain records that satisfy the second data query.

For the storage of the attribute value information, a first and second storage device may be provided. The first storage device (e.g. memory 110) having higher data access performance than the second storage device (e.g. storage 120 may be disk storage). Storing the attribute value information on the memory may avoid the step of loading it from a persistent storage into main memory for a scan that requires it.

In an example, the storage of the attribute value information of a first data block of the first data blocks b1-b5 may include: determining access frequency to the first data block, and storing the attribute value information of the first data block in the first or second storage device based on the determined access frequency of the first data block. For example, if the determined access frequency is higher than a predefined frequency threshold, then the corresponding attribute value information may be stored on the memory 110 (first storage device). And, if the determined access frequency is smaller than the predefined frequency threshold, then the corresponding attribute value information may be stored on the storage 120 (for example a disk or a second storage device). This may speed up the access process to data.

The storing of the attribute value information of a given first data block may be performed immediately after generating of the attribute value information of that given first data block.

For example, the attribute value information of each of the first data blocks b1-b5 may be read (e.g. using the multidimensional data structure) to determine whether a first data block may contain rows that satisfy the second data query. Assuming, for exemplification purpose, the second data query searches for records having AGE=17, since the attribute value information may include the minimum and the maximum value of the attribute e.g. 131B, the data blocks whose range of values include the value 17 may be selected. Those selected data blocks may or may not contain the value 17. For example, data block b3 covers a range of values of the attribute 131B which is 10 to 20. This data block b3 may be selected as the range 10 to 20 includes searched value 17. However, data blocks such as data block b1 may not be scanned at all since their attribute value information indicate that e.g. b1 cannot have the value 17 of attribute 131B. In this way, processing resources may be saved as unnecessary scanning of data blocks may be avoided.

As shown in FIG. 2, the scan scan2 213 may be caused by the second data query, while scan1 may be caused by the first data query.

In an example, the second data query may be a subquery or inner query or nested query within the first data query. The first data query may cause at least a first and a second successive scan. The second data query may include the second scan (e.g. scan2 213). The first scan may be used to generate the attribute value information as described above with reference to the first data query.

Thus, after a short initial phase (the phase during which the attribute value information is generated), queries run with full attribute value information support.

As illustrated in FIG. 2, scan2 213 on the at least one attribute 131B (scan2 pertaining to different or to the same query) may exploit the attribute value information that the first scan scan1 has finished, even if the first scan has not yet processed all data blocks of the column. In other words, the processing of the second data query may include scanning data blocks b1-bN containing records of the data set. The data blocks b1-b5 include at least part of the first data blocks that are full and for which the attribute value information is not generated yet (e.g. because the first data query is still running in parallel to the second data query). The processing of the second data query includes generating attribute value information of a first data block of the at least part of the first data blocks if not yet generated when processing the first data query. In other words, the attribute value information may be generated in parallel by processing the first and second data queries, if the processing of the second data query starts while the first data query processing is not yet finished.

After the first scan scan1, all other subsequent scans benefit from the attribute value information. As illustrated in FIG. 2, data blocks z1-z3 refer to first data blocks b1-b3 respectively for which the attribute value information is generated by the scan1 211. Scan2 213 may for example read the status parameter of the data blocks b1-b3 that indicates that they have attribute value information and may use the attribute value information for evaluating the second data query. If for example, data block b4 has not yet the attribute value information, scan2 213 may be processed on that data block b4 and may generate the attribute value information for b4.

In another example, the second data query may include a write data access request. In this case, the processing of the second data query may include: in response to determining that a first (full) data block b1-b5 of the first data blocks to be processed by the second data query has (or associated with) the first value of the status parameter, invalidating the attribute value information of the determined first data block by setting the status parameter of the determined first data block to the second value. In other words, if a given first data block for which the attribute value information has been previously generated as explained above becomes not full anymore or full but some of its records are replaced, then the attribute value information associated with it may be invalid. When scanning again this given first data block by the second data query it may be beneficial to invalidate the attribute value information of this given first data block.

In an example, the invalidation of the attribute value information may be performed by using a fourth value of the status parameter. The fourth value indicates a fourth state of the data block (for which the attribute value information is invalidated) in which the data block requires an update (or revalidation) of the attribute value information of the data block. The invalidation may include setting the status parameter to the fourth value. Then, upon receiving a third data request which is a read request involving a condition on at least one of the at least one attribute, the invalidated attribute value information may be updated when processing the third data request, e.g. by regenerating the attribute value information using the current content of the data block.

Figure 3:
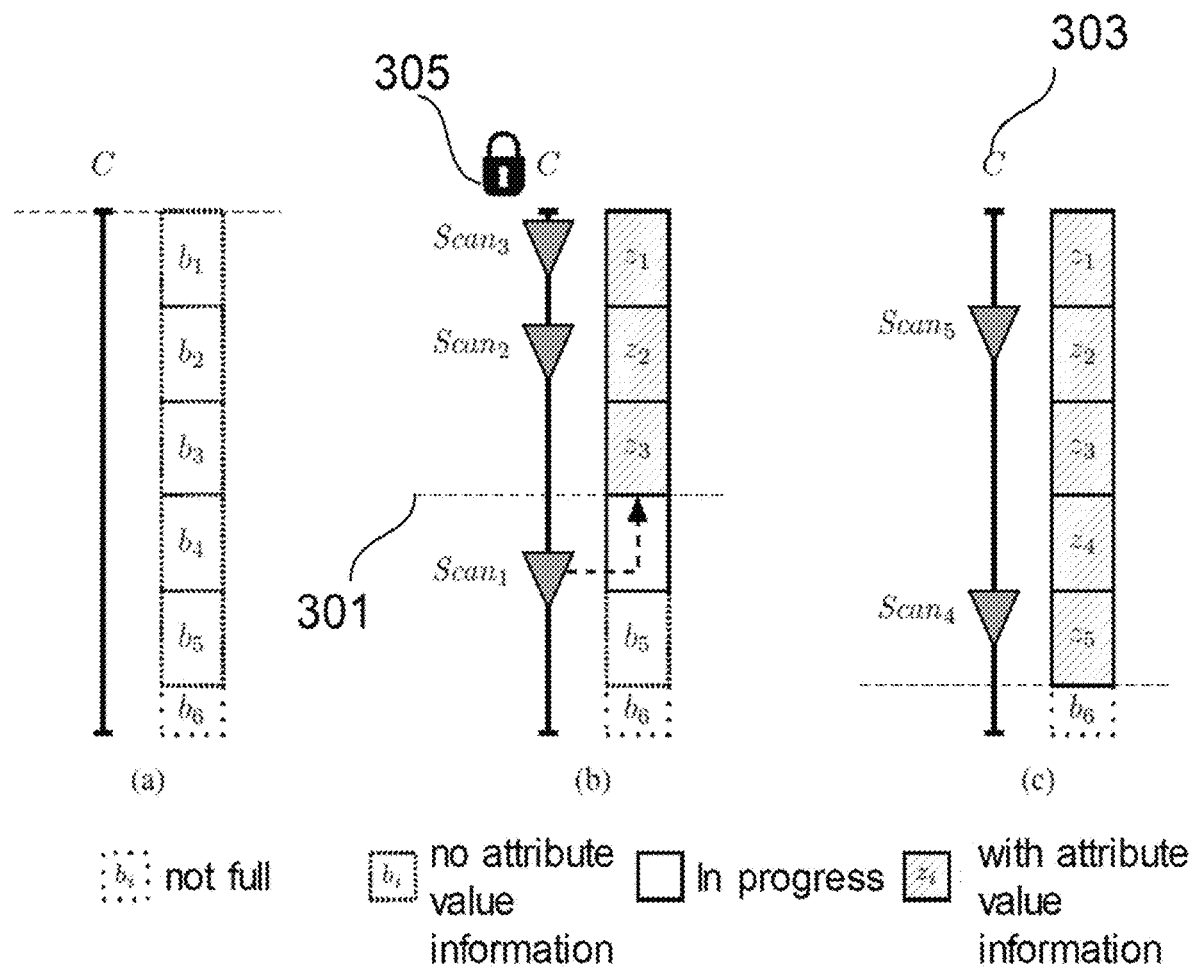
FIG. 3 illustrates a method for generating attribute value information, in accordance with an embodiment of the present invention.

FIG. 3 illustrates a method for generating attribute value information.

As described above, the data block b6 is not full while data blocks b1-b5 are full. FIG. 3 further illustrates scans, scan1-scan5, of the same or different queries. The scans scan1-5 may be executed in sequence starting from scan1. As illustrated in FIG. 3, data blocks z1-z5 refer to first data blocks b1-b5 respectively for which the attribute value information is generated.

The scans scan1-5 may be caused by one or more queries involving a condition on the attribute C 303 e.g. of the data set 127. In one example, the attribute 303 may be locked for attribute value information computation by a scan of the scans scan1-5.

Each scan of the scans scan1-scan5 when being executed may perform the following:

1. The scan checks whether the attribute 303 of the data set 127 has any data blocks of the data set 127 that have attribute value information. If so, it evaluates the scan predicates on them and determines which of these data blocks it may scan.

2. The scan checks whether there are data blocks that are full but have no attribute value information and adds them to its scan list. If the attribute 303 has such data blocks, the scan automatically checks whether the attribute 303 is locked for attribute value information computation and if not, locks it. It marks the data blocks as needing attribute value information computation (e.g. using the status parameter described above). If the attribute 303 is already locked, the scan will scan these data blocks, but not attempt to compute the attribute value information for them.
3. The scan adds all data blocks that are not full to its scan list.

If new data can only be appended at the end of the column (corresponding to the attribute 303), then all data blocks up to a given limit have attribute value information. Every scan that computes new attribute value information for records for full data blocks raises this limit, as indicated by the dashed horizontal lines 301 in FIG. 3. This way, the check in step 1 can be implemented very efficiently.

In the example illustrated in FIG. 3, Scan1 could not find any data blocks that have attribute value information and thus locked attribute (column) C 303 for attribute value information computation. Scan2 and Scan3 may skip scanning some of the data blocks z1; : : : ; z3 that have attribute value information. They may scan data blocks b4 and b5 without using attribute value information. Also, they may not compute attribute value information for b4 and b5, because they could not acquire the lock on attribute 303 e.g. only scan1 may have access to the lock 305. As block b6 is not full, all scans may read it, but none of them may compute attribute value information for it. At the time Scan4 and Scan5start, Scan1 has finished the attribute value information computation for all full data blocks and released the lock 305 on attribute 303. There are no data blocks that are full and have no attribute value information then. If, at a later point in time, more data is inserted, so that b6 becomes full, the next scan will lock attribute 303 and compute attribute value information for b6.

In another example, if at a later point in time a data block of the full data blocks b1-b5 for which the attribute value information is calculated may not be full, e.g. caused by a deletion, then the next scan may update the attribute value information of that non-full data block in case the previous attribute value information of that non-full data block is invalid e.g. the maximum attribute is not valid, e.g. because the deleted record had that maximum attribute value.

In the following, further examples of the present method may be described.

Deletes:

An advantage of the present method may be that the non-persistent nature of the attribute value information enables the attribute value information to be more up-to-date because they may easily be recomputed more often. This is in contrast to keeping the attribute value information on persistent storage. Thus, even after intensive deletions of data records the attribute value information still contains valid lower and upper bounds, but not necessarily the greatest and smallest lower and upper bounds, which makes them less effective.

Reorganization, Migration, and Restore:

Some systems should be reorganized from time to time, e.g. to reclaim space of deleted records, cluster the data in a desired order, or recompute compression dictionaries. This may cause the values of an attribute to be distributed over data blocks differently. This may render the attribute value information invalid. Following the principle of lazily computing the attribute value information, these attribute value information may be invalid and may be discarded. And, they will be recomputed only when a scan first requires them.

Similarly, scenarios such as data migration, backup, and restore do not cause attribute value information computation in the present method. Thus, not only is unnecessary attribute value information computation avoided where there is never a benefit, but these tasks also can be finished faster.

Discarding Attribute Value Information:

To limit the memory footprint of the attribute value information, the present method may particularly be flexible. To save memory, the attribute value information of attributes that is not required very often, may be deleted. A least recently used (LRU) approach can be applied for this. The deletion of attribute value information can be triggered if the total memory space occupied by all attribute value information structures exceeds a given amount.

Alternatively, attribute value information may be allowed to grow endlessly until memory runs out at a global level.

If discarded attribute value information are required for an attribute, they can be recomputed by the next scan on the attribute that would benefit from them. Alternatively, recomputation may be delayed until attribute value information for this attribute have been requested multiple times, in order to avoid thrashing effects. In this case, the scans requiring attribute value information increase an atomic counter and only lock the column for attribute value computation if the counter exceeds a given threshold. For completeness, delayed attribute value information computation can be for the initial creation of attribute value information to avoid keeping attribute value information that are seldom used.

Updating Attribute Value Information:

As described above, attribute value information may be generated if data blocks are full. This may for example be beneficial in case that (1) new data is only appended at the end and (2) that the blocks are not extremely large, so that scanning them is inexpensive. However, it may also be beneficial to regenerate or update attribute value information for the non-full data blocks as well.

If attribute value information is computed for data blocks that are not full, the attribute value information may be outdated when new data is inserted. A write transaction inserting new data into a data block may (1) pessimistically assume that the attribute value information has become invalid. Or it can (2) check whether the attribute value information still holds by comparing the inserted data to it. The write transaction may invalidate the attribute value information for the next scan to recompute. Or it can update the attribute value information.

The same solutions can be applied if a system allows inserting data not only at the end, but in arbitrary places. In-place-updating also falls under this category.

Parallel Computation of the Attribute Value Information:

For example, at most one scan may generate attribute value information for the same column or attribute at the same time. This may be design decision so that only one column-wide lock may be required rather than one lock per data block. However, it may be beneficial to have several scans compute the attribute value information for different data blocks of the same column in parallel. This may reduce the load of the first scan. Moreover, by carefully choosing the starting points of the scans at positions anywhere in the column, several parallel scans could benefit mutually from the attribute value information they are producing at the same time.

In another example, a computer-implemented method for processing attribute value information for a data set (data table) is provided. The method includes receiving a data query on a data set, the data query involving a condition on at least one attribute, in connection with processing the data query, scanning data blocks containing records of the data set, the data blocks containing first data blocks that are full, preparing attribute value information for the at least one attribute for the first data blocks, the attribute value information containing at least one of the following: minimum attribute value of a data block, maximum attribute value of a data block, storing the attribute value information (in memory or persistently) for further data queries involving a condition on at least one of the at least one attribute, the further data queries being processed using the attribute value information.

Figure 4:
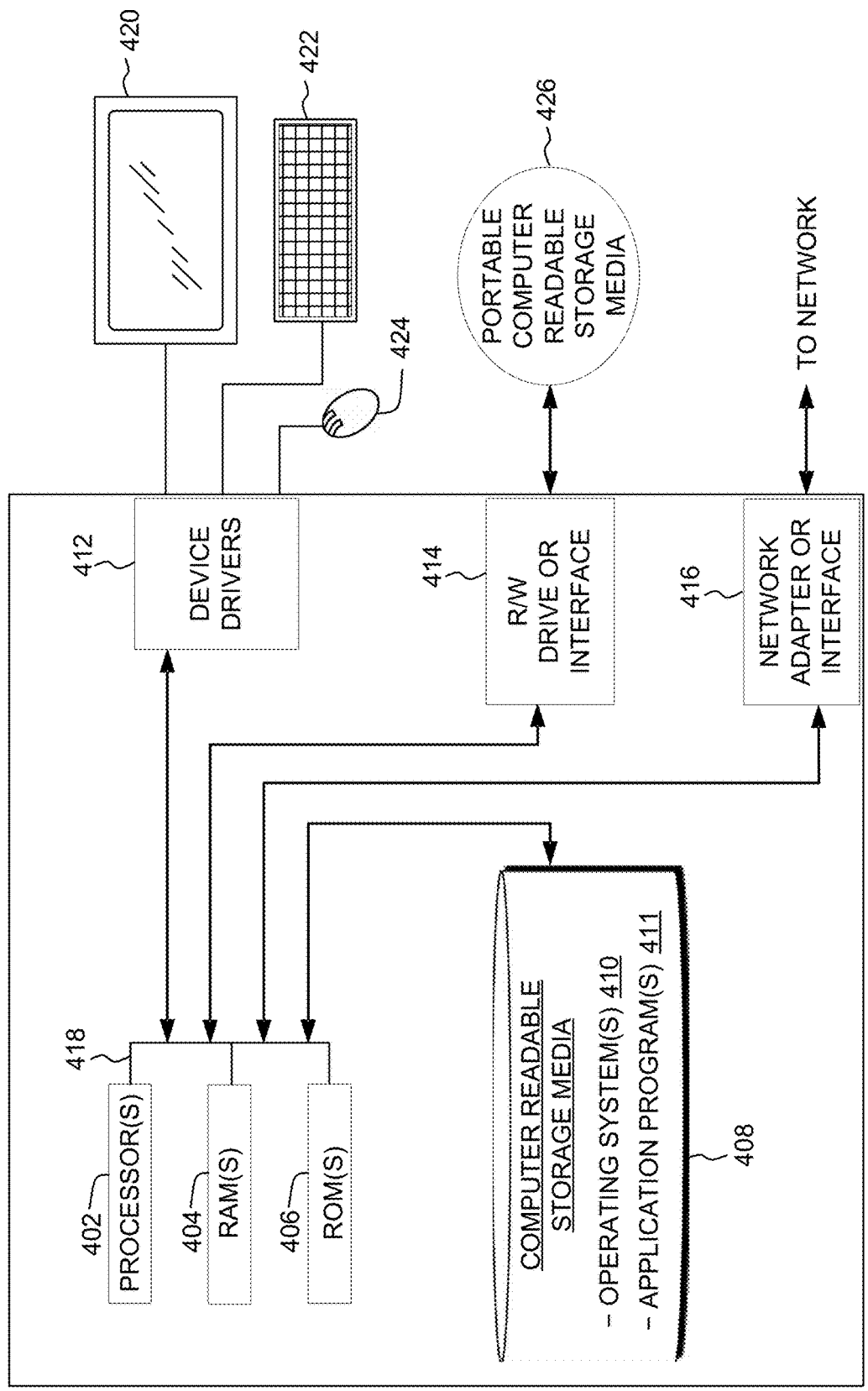
FIG. 4 is a functional block diagram of components of a proxy server computer, in accordance with an embodiment of the present invention.

Referring now to FIG. 4, a block diagram of components of a computing device, such as the computer 101 of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, software 112, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include a network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may include copper wires, optical fibers, wireless transmission, routers, firewalls, switches, gateway computers and/or edge servers.

The computing device may also include a display screen 420, a keyboard or keypad 722, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer program product for processing attribute value information for a data set, the computer program product comprising:

one or more computer-readable storage medium and program instructions store on the one or more computer-readable storage media, the program instructions comprising:

program instruction to receive a first data query on the data set, the first data query comprising a condition on an attribute of the data set;

in response to processing the first data query, program instruction to scan data blocks containing records of the data set, the data blocks containing one or more data blocks that are full;

program instruction to generate attribute value information for the attribute for each of the one or more data blocks; and program instruction to store the attribute value information for each of the one or more data blocks;

program instructions to assign a status parameter to each data block of the one or more data blocks, the status parameter having a first value, a second value or a third value, the first value indicating a first state of the data block which identifies the associated data block has an associated attribute value information, the second value indicating a second state of the data block which identifies the associated data block does not have an associated attribute value information, the third value indicating a third state of the data block which identifies the associated data block does not have an associated attribute value information and the associated attribute value information is not to be generated;

processing the first data query on the data set using the stored attribute value information; and program instruction to process a second data query on the data set using the stored attribute value information, the second data query comprising a second condition on the attribute.

2. The computer program product of claim 1, wherein program instruction to process the second data query comprises:

program instruction to regenerate the attribute value information of the first data block in response to determining that a first data block of the one or more data blocks is modified.

3. The computer program product of claim 1, wherein program instruction to process the second data query further comprises:
program instruction to compare the value of the attribute of a record to be inserted into a second data block of the one or more data blocks with the attribute value information of the second data block, and program instructions to assign a status parameter of the second data block to the second value.

4. The computer program product of claim 1, wherein program instruction to process the second data query further comprises:
program instruction to delete attribute value information of a fourth data block of the one or more data blocks and program instructions to assign a status parameter of the fourth data block to the second value.

5. The computer program product of claim 1, wherein program instruction to process the second data query further comprises:
program instruction to generate attribute value information of a fifth data block of the one or more data blocks.

6. The computer program product of claim 1, wherein processing the second data query further comprises:
program instruction to write a record into a sixth data block of the one or more data blocks; and
program instruction to set a status parameter of the sixth data block to the second value.

7. The me computer program product of claim 1, further comprising:
program instruction to provide a first storage device and a second storage device, the first storage device having higher data access performance than the second storage device;
program instruction to determine an access frequency to an eighth data block of the one or more data blocks; and
program instruction to store attribute value information of the eighth data block in the first storage device based on the determined access frequency of the eighth data block.

8. The computer program product of claim 1, further comprising:
program instruction to determine an access frequency to a ninth data block of the one or more data blocks; and
program instruction to delete attribute value information of the ninth data block dependent upon the determined access frequency being smaller than a predetermined frequency threshold.

9. The computer program product of claim 8, further comprising:
program instruction to assign a counter to the ninth data block;
program instruction to increment the counter upon receiving a data query for accessing the ninth data block; and
program instruction to regenerate the attribute value information for the ninth data block when the counter exceeds a minimum number of accesses.

10. The computer program product of claim 1, the attribute value information comprising:
a minimum attribute value information associated with each data block of the one or more data blocks; and
a maximum attribute value information associated with each data block of the set of data blocks.

11. The computer program product of claim 1, wherein the second data query comprises a read request.

12. The computer program product of claim 1, further comprising:
the status parameter having a fourth value indicating a fourth state of the data block which identifies the associated data block requires an updating of the associated attribute value information.

13. The computer program product of claim 1, wherein program instruction to process the first data query further comprises:
program instruction to lock the attribute value information of each block of the one or more data blocks; and
program instruction to generate attribute value information comprises reading a lock status of each block of the one or more data blocks.

14. The computer program product of claim 13, wherein:
program instruction to process the second data query occurs prior to a completion of program instruction to process the first data query; and
program instruction to prevent access to a lock status of each data block of the one or more data blocks.

15. The computer program product of claim 13, further comprising:
program instruction to unlock the attribute value information of each block of the one or more data blocks upon completion of program instruction to process of the first data query.

16. A computer program product for processing attribute value information for a data set, the computer program product comprising:
one or more computer-readable storage medium and program instructions store on the one or more computer-readable storage media, the program instructions comprising:
receiving a first data query on the data set, the first data query comprising a condition on an attribute of the data set;
in response to program instructions to process the first data query, program instructions to scan a status parameter of each data block of the one or more data blocks data blocks of the data set;
in response to a status parameter having a first value, program instructions to process the first data query using attribute value information of the associated data block;
in response to a status parameter having a second value, program instructions to scan data blocks of the associated data block, program instructions to generate attribute value information, program instructions to store the attribute value information, program instructions to assign a first value to the status parameter, and program instructions to process the first data query using attribute value information of the associated data block; and
in response to a status parameter having a third value, program instructions to process the first data query of the associated data block.

17. The computer program product of claim 16, further comprising:
in response to a status parameter having a fourth value, program instructions to scan data blocks of the associated data block, program instructions to generate attribute value information, program instructions to store the attribute value information, program instructions to assign a first value to the status parameter, and program instructions to process the first data query using attribute value information of the associated data block.

18. The computer program product of claim 16, further comprising:
- program instructions to receive a write access request on the data set;
- in response to processing the write access request, program instructions to scan a status parameter of each data block of the one or more data blocks of the data set;
- in response to a status parameter having a third value, program instructions to process the write access request to the associated data block; and
- in response to the associated data block being full, program instructions to assign a second value to the associated status parameter.

19. A computer program product for processing attribute value information for a data set, the computer program product comprising:
- one or more computer-readable storage medium and program instructions store on the one or more computer-readable storage media, the program instructions comprising:
- program instructions to generate attribute value information for each data block of the one or more data blocks of the data set only after receiving a first data query on the data set, the first data query comprising a condition on an attribute of the data set;
- in response to processing the first data query, program instructions to scan data blocks of the data set containing records of the data set, the data blocks containing one or more data blocks that are full;
- program instructions to generate attribute value information for the attribute for each of the one or more data blocks;
- program instructions to store the attribute value information for each of the one or more data blocks;
- program instructions to assign a first value to a status parameter to each data block of the one or more data blocks that are full, the status parameter having a first value, a second value or a third value,
- the first value indicating a first state of the data block which identifies the associated data block has an associated attribute value information;
- in response to processing the first data query, program instructions to scan data blocks of the data set containing records of the data set, the data blocks containing one or more data blocks that are not full; and
- program instructions to assign a third value to a status parameter to each data block of the one or more data blocks that are not full,
- the third value indicating a third state of the data block which identifies the associated data block does not have an associated attribute value information and the associated attribute value information is not to be generated.

20. The computer program product of claim 19, further comprising:
- program instructions to receive a write access request on the data set;
- in response to processing the write access request, program instructions to scan a status parameter of each data block of the one or more data blocks of the data set;
- in response to a status parameter having a third value, program instructions to process the write access request to the associated data block; and
- in response to the associated data block being full, program instructions to assign a second value to the associated status parameter,
- the second value indicating a second state of the data block which identifies the associated data block does not have an associated attribute value information.

* * * * *